(12) United States Patent  
Preuss

(10) Patent No.: US 6,540,183 B1
(45) Date of Patent: Apr. 1, 2003

(54) VERSATILE MATERIAL CART SYSTEM

(76) Inventor: Michael A. Preuss, 102 S. Main St., Belview, MN (US) 56214

(*) Notice: Subject to any disclaimer, the term of this patent is extended or adjusted under 35 U.S.C. 154(b) by 0 days.

(21) Appl. No.: 09/996,647

(22) Filed: Nov. 27, 2001

(51) Int. Cl.[7] ................................................. A47K 1/04
(52) U.S. Cl. ..................................... 248/129; 280/79.3
(58) Field of Search ............................. 248/229, 188.5, 248/129, 132, 161, 157, 407, 410, 354, 155.3, 155; 280/79.2, 79.3, 47.34, 47.35; 211/193, 168; 103/137, 180, 155

(56) References Cited

U.S. PATENT DOCUMENTS

| 1,055,201 | A | | 3/1913 | Mason |
| 1,246,837 | A | | 11/1917 | Anthony |
| 1,563,057 | A | * | 11/1925 | Williams ..................... 211/134 |
| 2,008,180 | A | * | 7/1935 | Karnes ........................ 248/243 |
| 2,290,410 | A | | 7/1942 | Dawson ........................ 155/82 |
| 3,139,187 | A | * | 6/1964 | Wolfson ....................... 211/60 |
| 3,635,352 | A | * | 1/1972 | Brooks et al. ................. 211/47 |
| 4,262,439 | A | | 4/1981 | Dinan et al. .................. 40/607 |
| 4,706,915 | A | * | 11/1987 | Cindrie et al. ............... 248/122 |
| 5,071,098 | A | | 12/1991 | Aldridge ................... 248/219.4 |
| 5,236,095 | A | * | 8/1993 | Krizka ......................... 211/96 |
| 6,129,320 | A | | 10/2000 | Warren-Pfaeffle ........ 248/124.1 |
| 6,240,853 | B1 | | 6/2001 | Paskey et al. .............. 108/146 |
| 6,390,311 | B1 | * | 5/2002 | Belokin ....................... 211/204 |

* cited by examiner

Primary Examiner—Ramon O. Ramirez
Assistant Examiner—Kofi Schulterbrandt

(57) ABSTRACT

A versatile material cart system for efficiently handling elongate material in adjustable sections. The versatile material cart system includes a base having a plurality of caster wheels attached thereto, a pair of center support members attached to opposing ends of the base, a plurality of locking members attached to each of the center support members, a plurality of arm members having a collar slidably and rotatably positioned about the center support members, a plurality of side arms pivotally attached to the corners of the base, and a plurality of cross members attached to the upper ends of the center support members. The collar of the arms members has a slot for sliding about the locking members and a plurality of notches within a lower edge for catchably receiving with the locking members. The plurality of arm members are adjustable vertically and rotatably thereby allowing for the creation of various material receiving sections.

20 Claims, 7 Drawing Sheets

VERSATILE MATERIAL CART SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to material carts and more specifically it relates to a versatile material cart system for efficiently handling elongate material in adjustable sections.

2. Description of the Prior Art

Material handling carts have been in use for years. Typically, a material handling cart is comprised of a base having a plurality of caster wheels attached to the bottom thereof, and a support frame for supporting the elongate material such as lumber or metal.

The main problem with conventional material handling carts is that they are not adjustable to accommodate and separate various types of materials. Another problem with conventional material handling carts is they are not suitable for compact storage when not in usage. A further problem with conventional material handling carts is that they do not provide a means for selectively engaging material within to prevent accidental removal of the material from the cart. Another problem with conventional material handling carts is that they are not suitable for handling multiple small jobs in a sorted manner.

Examples of patented devices which are related to the present invention include U.S. Pat. No. 2,290,410 to Dawson; U.S. Pat. No. 4,262,439 to Dinan; U.S. Pat. No. 5,071,098 to Aldridge; U.S. Pat. No. 6,129,320 to Warren-Pfaeffle; U.S. Pat. No. 6,240,853 to Paskey; U.S. Pat. No. 4,262,439 to Dinan; U.S. Pat. No. 1,246,837 to Anthony; U.S. Pat. No. 1,055,201 to Mason.

While these devices may be suitable for the particular purpose to which they address, they are not as suitable for efficiently handling elongate material in adjustable sections. Conventional material handling carts are not suitable for handling multiple small jobs in a sorted manner.

In these respects, the versatile material cart system according to the present invention substantially departs from the conventional concepts and designs of the prior art, and in so doing provides an apparatus primarily developed for the purpose of efficiently handling elongate material in adjustable sections.

SUMMARY OF THE INVENTION

In view of the foregoing disadvantages inherent in the known types of material handling carts now present in the prior art, the present invention provides a new versatile material cart system construction wherein the same can be utilized for efficiently handling elongate material in adjustable sections.

The general purpose of the present invention, which will be described subsequently in greater detail, is to provide a new versatile material cart system that has many of the advantages of the material handling carts mentioned heretofore and many novel features that result in a new versatile material cart system which is not anticipated, rendered obvious, suggested, or even implied by any of the prior art material handling carts, either alone or in any combination thereof.

To attain this, the present invention generally comprises a base having a plurality of caster wheels attached thereto, a pair of center support members attached to opposing ends of the base, a plurality of locking members attached to each of the center support members, a plurality of arm members having a collar slidably and rotatably positioned about the center support members, a plurality of side arms pivotally attached to the corners of the base, and a plurality of cross members attached to the upper ends of the center support members. The collar of the arms members has a slot for sliding about the locking members and a plurality of notches within a lower edge for catchably receiving with the locking members. The plurality of arm members are adjustable vertically and rotatably thereby allowing for the creation of various material receiving sections.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a versatile material cart system that will overcome the shortcomings of the prior art devices.

A second object is to provide a versatile material cart system for efficiently handling elongate material in adjustable sections.

Another object is to provide a versatile material cart system that is capable of retaining multiple small jobs in a sorted manner.

An additional object is to provide a versatile material cart system that reduces floor space required by reducing the number of material carts required.

A further object is to provide a versatile material cart system that is adjustable to accommodate various types of jobs.

Another object is to provide a versatile material cart system that had adjustable sections that allow for variations in retaining the material.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
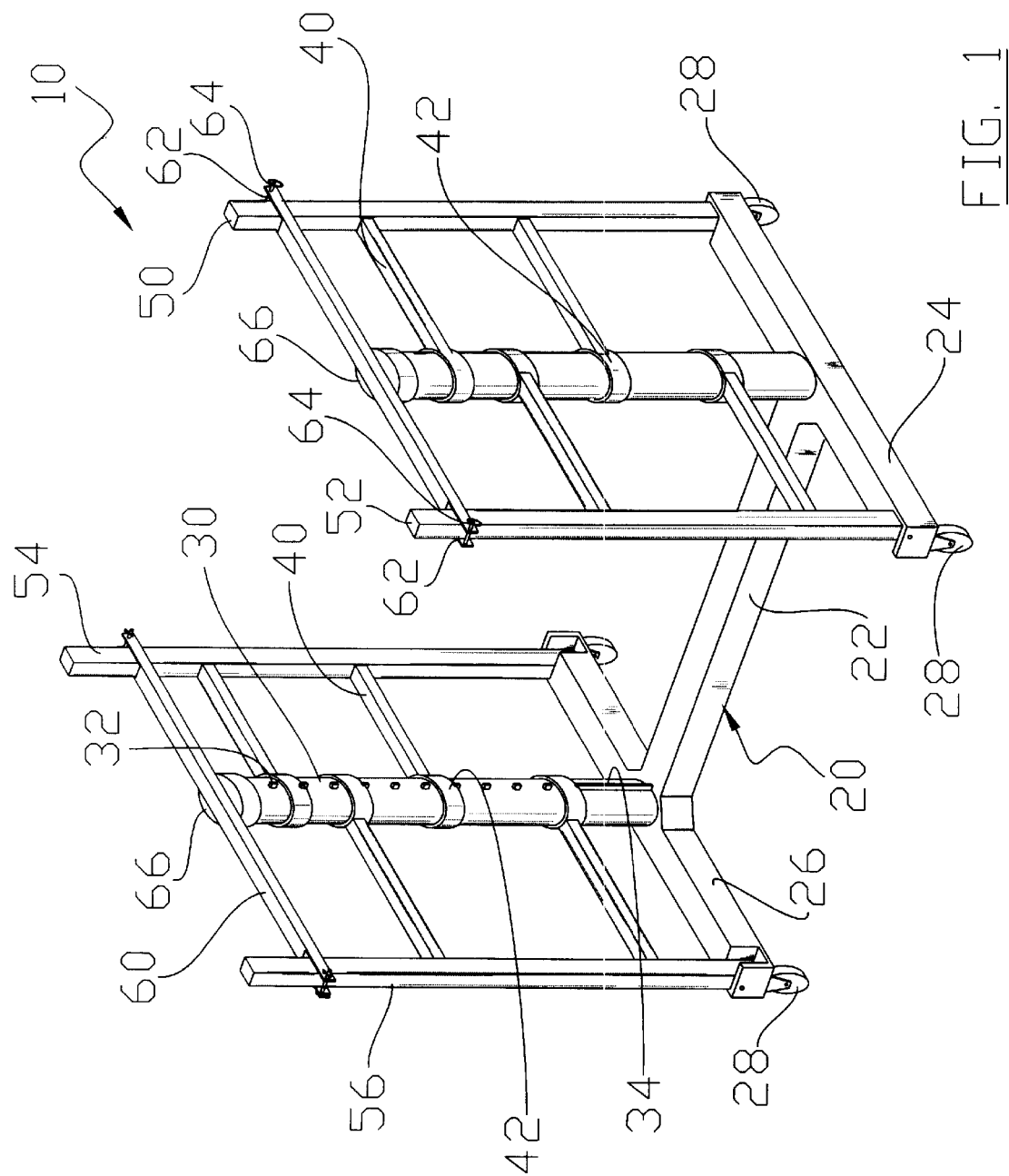
FIG. 1 is an upper perspective view of the present invention.

Turning now descriptively to the drawings, in which similar reference characters denote similar elements throughout the several views, FIGS. 1 through 7 illustrate a versatile material cart system 10, which comprises a base 20 having a plurality of caster wheels 28 attached thereto, a pair of center support members 30 attached to opposing ends of the base 20, a plurality of locking members 32 attached to each of the center support members 30, a plurality of arm members 40 having a collar 42 slidably and rotatably positioned about the center support members 30, a plurality of side arms pivotally attached to the corners of the base 20, and a plurality of cross members 60 attached to the upper ends of the center support members 30. The collar 42 of the arms members has a slot 44 for sliding about the locking members 32 and a plurality of notches 46 within a lower edge for catchably receiving with the locking members 32. The plurality of arm members 40 are adjustable vertically and rotatably thereby allowing for the creation of various material receiving sections.

Figure 2:
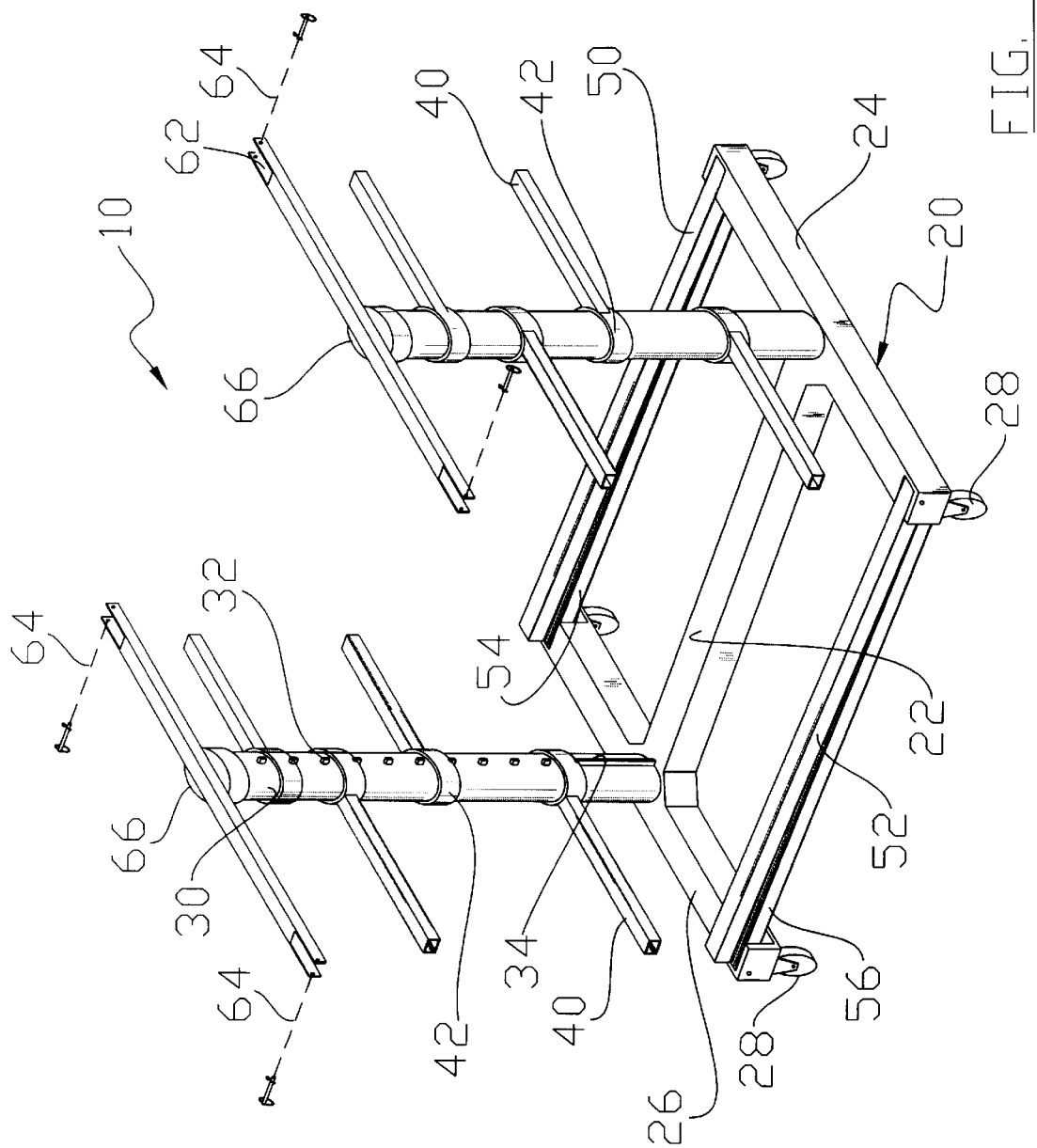
FIG. 2 is an upper perspective view of the present invention with the side support members folded down for allowing easy loading of material.

As shown in FIGS. 1 and 2 of the drawings, the base 20 is a substantially flat structure capable of supporting elongate material. The base 20 may have various shapes and structures other than the exemplary base 20 shown in FIGS. 1 and 2 of the drawings. The base 20 may be comprised of various materials such as but not limited to metal, plastic, composite material or wood.

Figure 3:
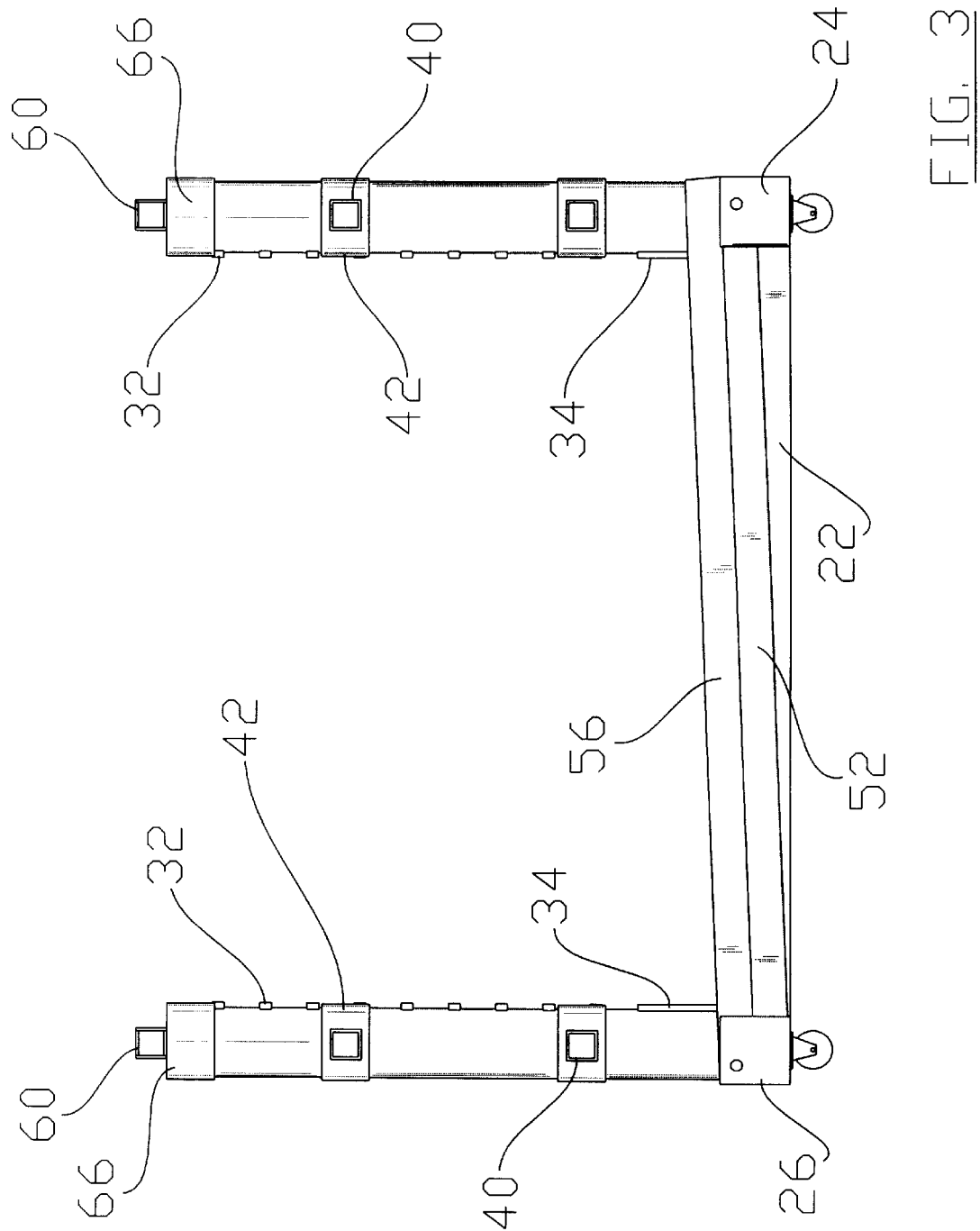
FIG. 3 is a side view of the present invention with the side support members folded down.
Figure 4:
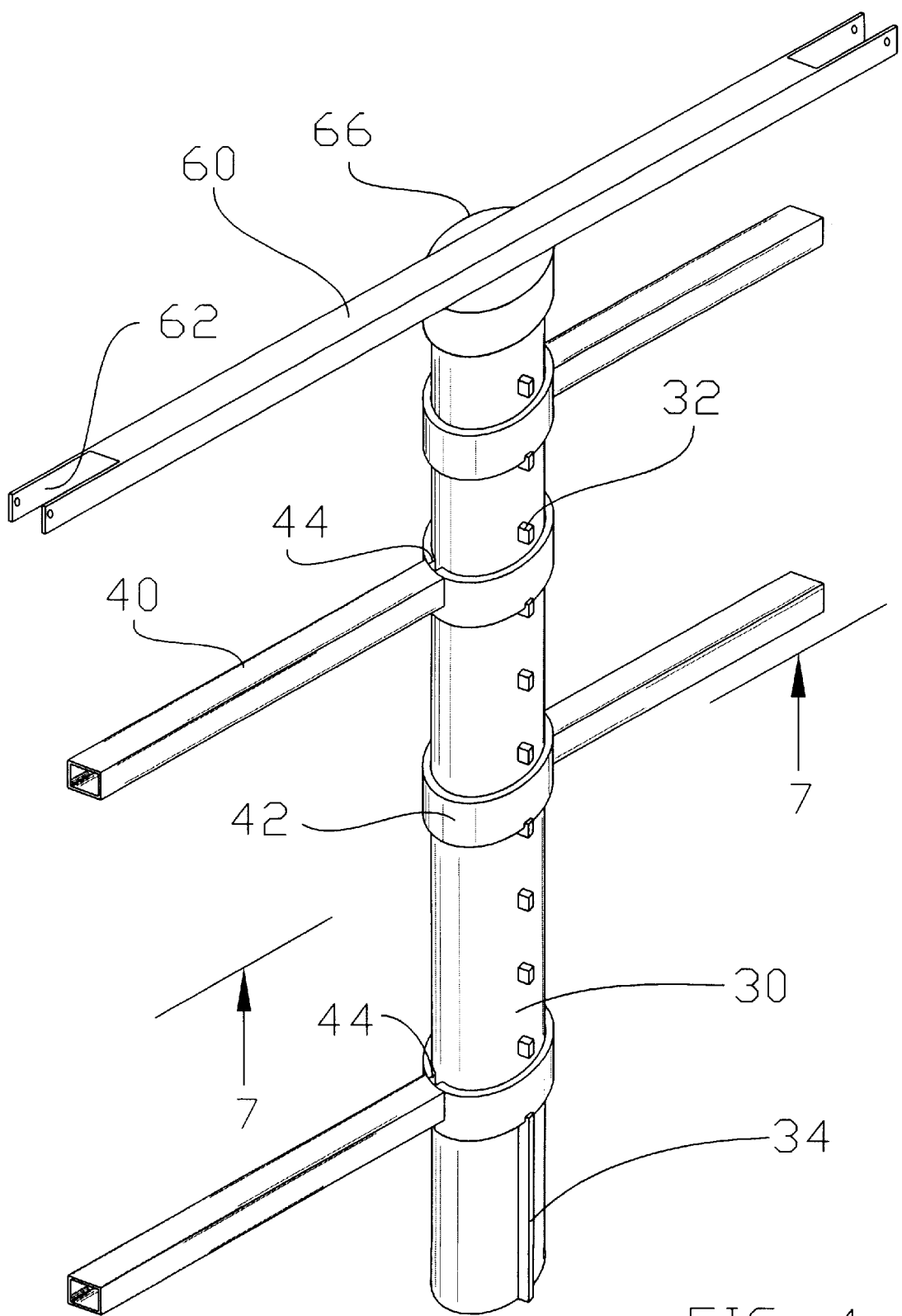
FIG. 4 is a magnified upper perspective view of a center support member with a plurality of arms extending from thereof.
Figure 5:
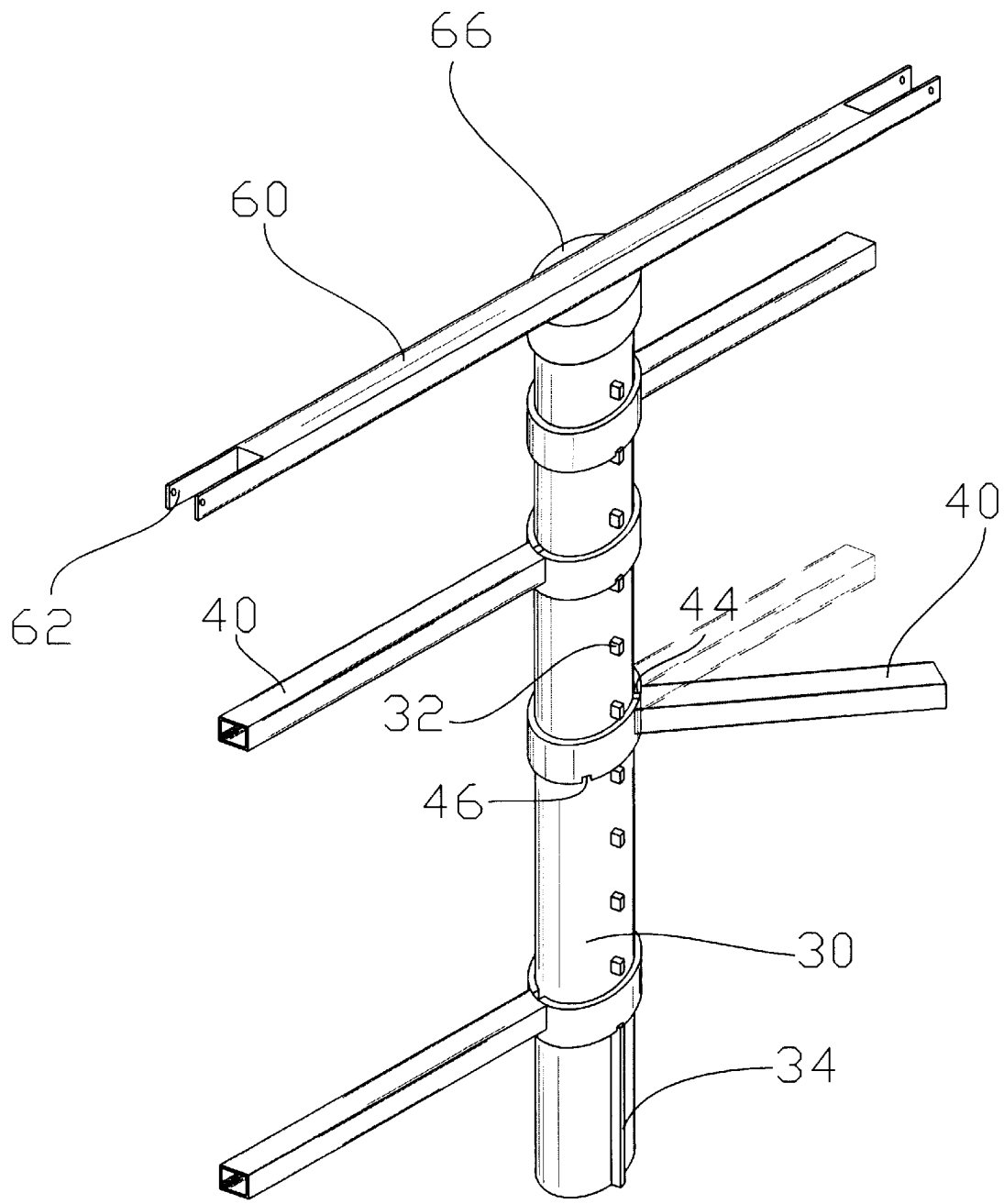
FIG. 5 is a magnified upper perspective view of the center support member with a central arm rotated.
Figure 6:
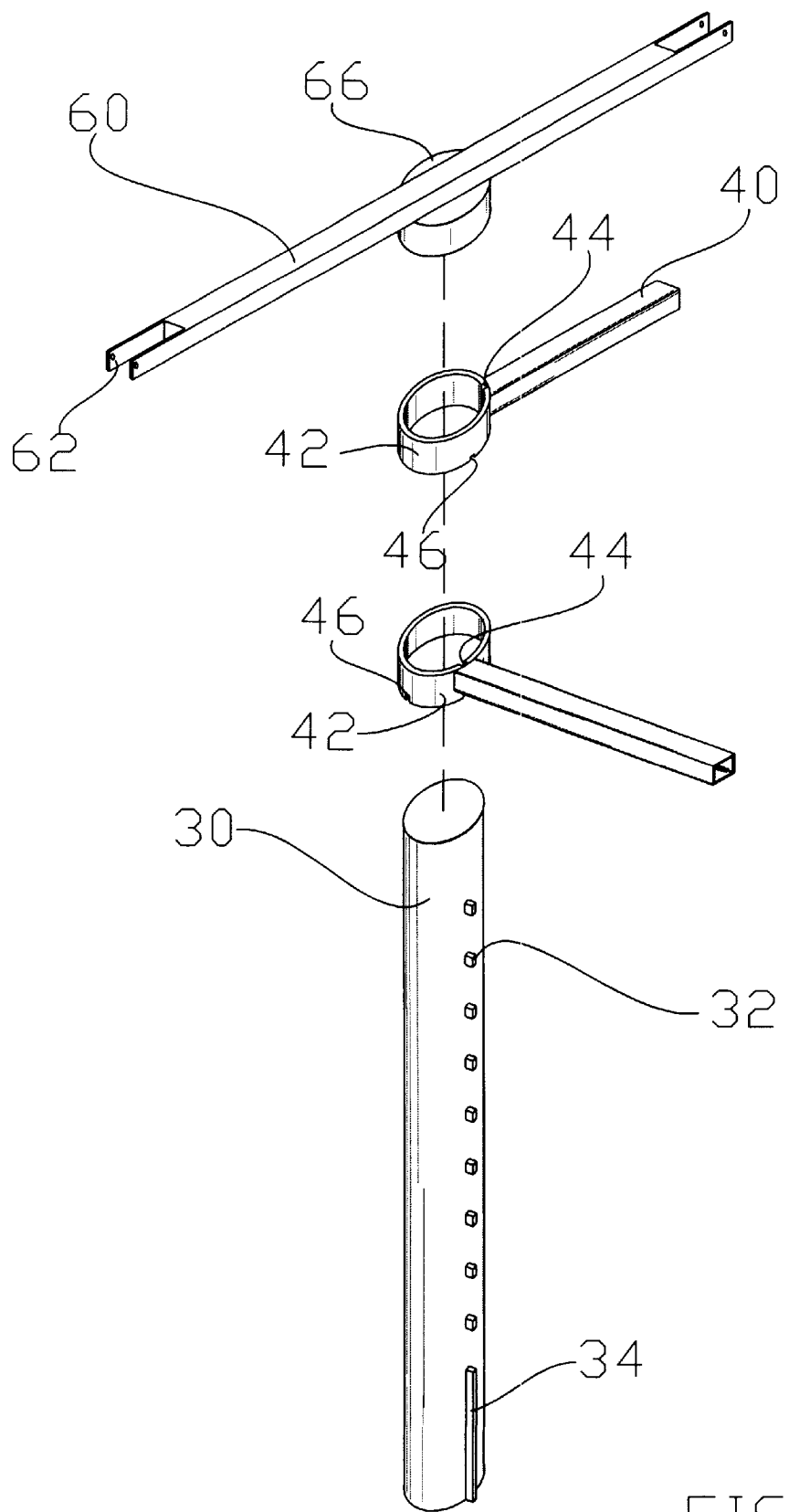
FIG. 6 is an exploded upper perspective view of the center support member and arm members.
Figure 7:
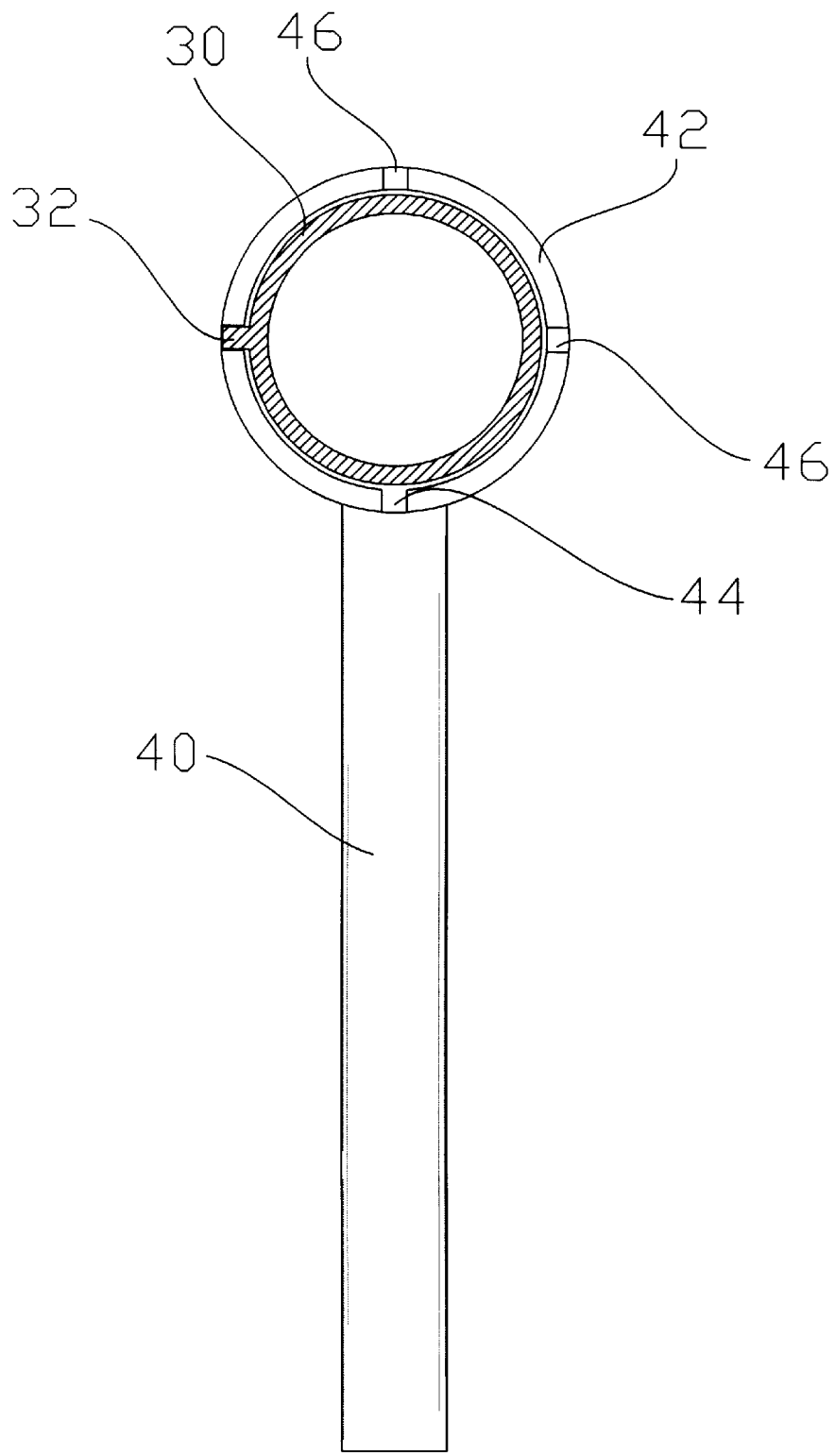
FIG. 7 is a cross sectional view taken along line 7—7 of FIG. 4.

As shown in FIGS. 1 and 2, the exemplary base 20 is preferably comprised of an elongate center member 22 having opposing ends. A first end member 24 and a second end member 26 are preferably traversely attached to the opposing ends of the center member 22 as shown in FIGS. 1 and 2. The end members 24, 26 preferably have a corresponding length thereby forming an I-shaped structure for the base 20. As shown in FIGS. 1 through 3 of the drawings, a plurality of caster wheels 28 are attached to the base 20 for allowing for easy maneuvering of the present invention upon a surface. It can be appreciated that various other types of wheels may be utilized upon the present invention.

As shown in FIGS. 1 through 3 of the drawings, a pair of opposing center support members 30 are attached to opposing ends of the base 20. The center support members 30 each extend upwardly a finite distance. The center support members 30 may have various cross sectional shapes, however the center support members 30 preferably have a circular cross sectional shape for facilitating rotation of the arm members 40.

As shown in FIGS. 1 through 6 of the drawings, each of the center support members 30 includes a plurality of locking members 32 extending outwardly from thereof. The locking members 32 are comprised of a nub structure or similar structure. The locking members 32 are preferably aligned in a vertical manner and spaced apart a finite distance. The distance between each of the locking members 32 is at least the height of the collar 42 of the arm members 40 for allowing rotation of the arm members 40 about the center support members 30. The locking members 32 preferably extending from a lower portion to an upper portion of the center support members 30 to allow for the creation of various levels of material receiving sections. The locking members 32 prevent the arm members 40 from sliding downwardly upon the center support members 30. As best shown in FIGS. 1 and 3 of the drawings, an elongate solid member 34 is attached to the lower portion of the center support members 30 for preventing the rotation of the arm members 40 when fully lowered upon the center support members 30.

As shown in FIGS. 1 through 5 of the drawings, a plurality of arm members 40 are rotatably and vertically slidably positioned upon each of the center support members 30. The arm members 40 have a collar 42 attached to an inner end thereof as best shown in FIGS. 4 through 7 of the drawings. The collar 42 includes a slot 44 that extend vertically through thereof adjacent to the arm members 40 for passing about the locking members 32 when adjusting the vertical position of the arm members 40. The lower edge of the collar 42 preferably includes one or more notches 46 within for catchably receiving one of the locking members 32 to prevent rotation of the arm members 40. The notches 46 may be positioned at ninety degrees with respect to one another or any other desirable angle. The notches 46 are preferably formed for allowing the arm members 40 to be extended substantially parallel to the end members 24, 26 as shown in FIG. 1 of the drawings.

As shown in FIGS. 1 through 5 of the drawings, a pair of opposing cross members 60 are attached to the upper ends of the center support members 30. The cross members 60 include a cap member 66 that is attachable positioned about the upper end of the center support members 30 or the cross members 60 may be directly attached to the center support members 30. The cross members 60 each have a pair of opposing U-shaped ends 62 for removably receiving the corresponding side arms 50, 52, 54, 56. A locking pin 64 extends through each of the U-shaped ends 62 for retaining the side arms 50, 52, 54, 56 catchably within the U-shaped ends 62.

As shown in FIGS. 1 and 2 of the drawings, a plurality of side arms 50, 52, 54, 56 are pivotally attached to the distal ends of the end members 24, 26. The side arms 50, 52, 54, 56 are pivotally attached in a plane that is parallel to a plane created between the center support members 30 as best shown in FIGS. 1 and 2 of the drawings. The side arms 50, 52, 54, 56 are preferably loosely attached within the base 20 so that there is sufficient maneuverability of the side arms 50, 52, 54, 56 to be positioned within and removed from the U-shaped ends 62 of the cross members 60 as shown in FIGS. 1 and 2 of the drawings. When fully extended vertically and locked within the cross members 60, the side arms 50, 52, 54, 56 retaining the material upon the arm members 40 as shown in FIG. 1 of the drawings. When fully retracted, the side arms 50, 52, 54, 56 are folded upon one another within two pairs as shown in FIG. 2 of the drawings.

In use, the user folds the side arms 50, 52, 54, 56 downwardly as shown in FIG. 2 of the drawings. The user further rotates each of the arm members 40 so that they are parallel with the center member 22 of the base 20 to allow for free positioning of material upon the base 20. The user first positions the desired material upon the base 20 on opposing sides of the center support members 30. The user then positions the lowest of the arm members 40 in the desired position upon the center support members 30 above the material positioned upon the base 20. The user then positions material upon the lowest of the arm members 40 in a desired manner. The user continues repositioning additional arm members 40 and then eventually may position elongate material upon the cross members 60. When the material is properly positioned upon the arm members 40, the user then may extend the side arms 50, 52, 54, 56 into their upright positions and secure them within the respective U-shaped ends 62 of the cross members 60 as shown in FIG. 1 of the drawings. The user then may move the cart system 10 with the material to a desired location and unload by simply reversing the above procedure. When the cart system 10 is not in use, the user typically folds the side arms 50, 52, 54, 56 and positions the arm members 40 upon the lower portion of the center support members 30 to decrease the overall size of the cart system 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A versatile material cart system, comprising:
   a base;
   a plurality of wheels attached to said base;
   a first support member extending from a first end of said base;
   a second support member extending from a second end of said base; and
   a plurality of arm members positioned about said support members in an adjustable vertical manner and an adjustable rotational manner;
   wherein said support members each include a plurality of locking members extending from thereof for supporting said plurality of arm members in a desired vertical position;
   wherein said plurality of arm members each include a collar slidably and rotatably positioned about said support members, wherein said collar includes a slot extending vertically through said collar for slidably receiving said locking members and allowing vertical adjustment of said plurality of arm members.

2. The versatile material cart system of claim 1, wherein said base is comprised of an I-shaped structure.

3. The versatile material cart system of claim 1, wherein said base is comprised of a center member, a first end member and a second end member, wherein said end members are attached transversely to opposing ends of said center member.

4. The versatile material cart system of claim 1, wherein said slot is positioned adjacent an inner end of each said arm member.

5. The versatile material cart system of claim 4, including at least one notch extending into a lower edge of said collar for selectively receiving one of said plurality of locking members.

6. The versatile material cart system of claim 1, including at least one notch extending into a lower edge of said collar for selectively receiving one of said plurality of locking members.

7. The versatile material cart system of claim 1, wherein said locking members include a solid member attached to a lower portion of said support members.

8. The versatile material cart system of claim 1, wherein said locking members are aligned in a vertical manner upon said support members, and wherein said locking members are spaced apart a distance greater than a height of said collar.

9. A versatile material cart system, comprising:
   a base;
   a plurality of wheels attached to said base;
   a first support member extending from a first end of said base;
   a second support member extending from a second end of said base;
   a plurality of arm members positioned about said support members in an adjustable vertical manner and an adjustable rotational manner;
   a first cross member attached to an upper end of said first support member;
   a second cross member attached to an upper end of said second support member; and
   a plurality of side arms pivotally attached to said base and selectively engaged within opposing ends of said cross members.

10. The versatile material cart system of claim 9, wherein said base is comprised of an I-shaped structure.

11. The versatile material cart system of claim 10, wherein said base is comprised of a center member, a first end member and a second end member, wherein said end members are attached traversely to opposing ends of said center member.

12. The versatile material cart system of claim 9, wherein said support members each include a plurality of locking members extending from thereof for supporting said plurality of arm members in a desired vertical position.

13. The versatile material cart system of claim 12, wherein said plurality of arm members each include a collar slidably and rotatably positioned about said support members, wherein said collar includes a slot extending vertically through said collar for slidably receiving said locking members and allowing vertical adjustment of said plurality of arm members.

14. The versatile material cart system of claim 13, wherein said slot is positioned adjacent an inner end of each said arm member.

15. The versatile material cart system of claim 14, including at least one notch extending into a lower edge of said collar for selectively receiving one of said plurality of locking members.

16. The versatile material cart system of claim 13, including at least one notch extending into a lower edge of said collar for selectively receiving one of said plurality of locking members.

17. The versatile material cart system of claim 13, wherein said locking members are aligned in a vertical manner upon said support members, and wherein said locking members are spaced apart a distance greater than a height of said collar.

18. The versatile material cart system of claim 12, wherein said locking members are comprised of a nub structure.

19. A versatile material cart system, comprising:
   a base;
   a plurality of support members extending from said base; and
   a plurality of arm members positioned about said support members in an adjustable vertical manner and an adjustable rotational manner;
   wherein said support members each include a plurality of locking members extending from thereof for supporting said arm members in a desired vertical position;
   wherein said plurality of arm members each include a collar slidably and rotatably positioned about said support members, wherein said collar includes a slot extending through said collar for slidably receiving said locking members and allowing vertical adjustment of said plurality of arm members.

20. The versatile material cart system of claim 19, including at least one notch extending into a lower edge of said collar for selectively receiving one of said plurality of locking members.

* * * * *